United States Patent Office 2,838,502
Patented June 10, 1958

2,838,502
6-FLUORO STEROIDS AND PROCESS

Philip F. Beal, Portage Township, Kalamazoo County, John A. Hogg, Kalamazoo Township, Kalamazoo County, and Robert W. Jackson, Kalamazoo, Mich., assignors to The Upjohn Company, Kalamazoo, Mich., a corporation of Michigan No Drawing. Application November 29, 1957
Serial No. 699,508

24 Claims. (Cl. 260—239.55)

This invention relates to 2α-methyl-6-fluorohydrocortisone and 21-esters thereof, to 2α-methyl-6-fluorocortisone and 21-esters thereof, to novel intermediates in the production thereof and to processes for the production of the novel compounds and the novel intermediates.

It has been discovered that 2α-methyl-6-fluorohydrocortisone and the 21-esters thereof and 2α-methyl-6-fluorocortisone and 21-esters thereof possess valuable antirheumatoid arthritic, anti-inflammatory and glucocorticoid activity to a marked degree. Thus, for example, 2α-methyl-6α-fluorohydrocortisone 21-acetate has been found to exhibit approximately thirty to forty times the anti-inflammatory activity of hydrocortisone. The compounds are useful in the treatment of inflammatory conditions of the skin, eyes and ears of humans and valuable domestic animals, contact dermatitis and other allergenic reactions. The compounds can be administered in conventional dosage forms such as pills, tablets and capsules for oral use or in conventional liquid forms as are used with natural and synthetic cortical steroid hormones for parenteral use. For topical use they can be administered in the form of ointments, creams, lotions, and the like with or without coacting antibiotics, germicides and the like.

The compounds of this invention can be prepared in accordance with the following scheme of reactions:

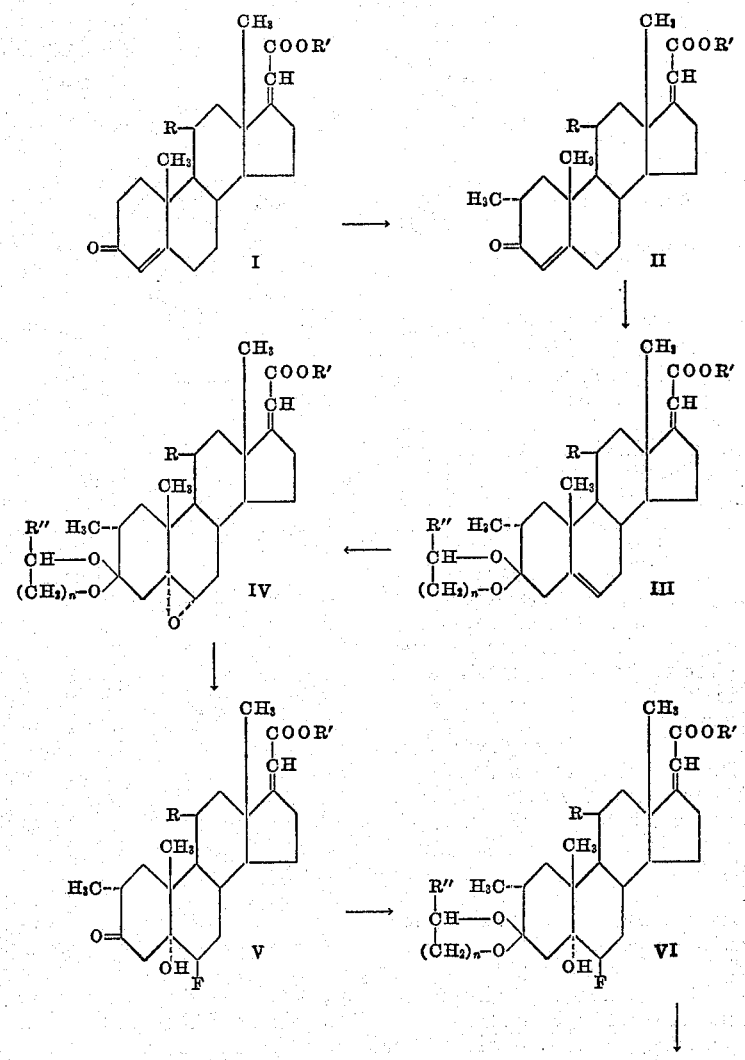

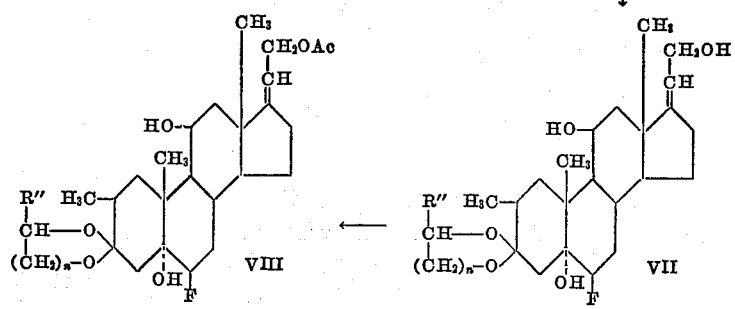

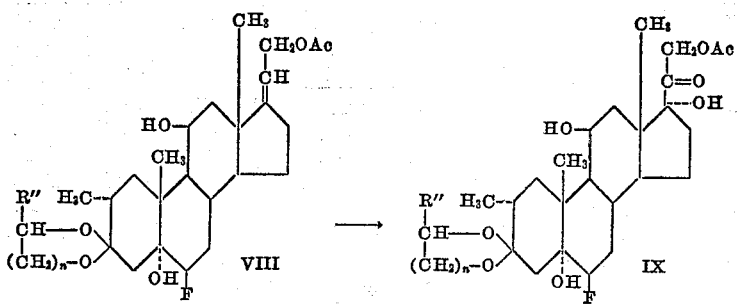

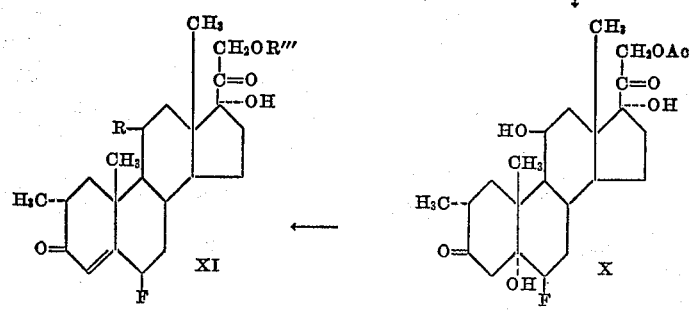

wherein R is hydroxy or keto, R' and R" are hydrogen or lower-alkyl, n is a whole number from one to two, Ac is the acyl radical of an organic acid, preferably a hydrocarbon carboxylic acid containing from one to twelve carbon atoms, inclusive, and R''' is hydrogen or Ac as defined above. The term "lower-alkyl," when used herein, refers to an alkyl radical of from one to eight carbon atoms, inclusive, e. g., methyl, ethyl, propyl, butyl, amyl, hexyl, heptyl, ethylhexyl, and octyl.

The above reactions will be exemplified in detail hereinbelow. It will be understood by those skilled in the art, nevertheless, that the specific order of steps can be inverted or transposed or otherwise varied to suit the purposes of economics, convenience, or the like.

The preferred compounds containing the 17(20)-double bond have the cis configuration, because the cis isomer can ultimately be converted in higher yields in the oxidative hydroxylation step than is ordinarily possible with the trans isomer. It should be understood, however, that the trans isomer or mixtures of the cis and trans isomers can be used with satisfactory results.

In carrying out the procses of the present invention, the first step involves methylation at the 2-position of a 3 - keto - 11 - oxygenated - 4,17(20) - pregnadiene - 21-carbonyloxy (I), which can be prepared as disclosed in U. S. Patent 2,774,776. Such methylation is accomplished by a process of condensation of a 3-keto-11-oxygenated-4,17(20)-pregnadiene-21-carbonyloxy compound, acidification of the condensation product, methylation, and, finally, reversal of the condensation step. In the condensation reaction, conducted in the presence of an alkali-metal alkoxide such as, for example, sodium methoxide, the said 3-keto-11-oxygenated steroid is condensed with, for example, diethyl oxalate to produce the alkali-metal enolate of the corresponding 2-ethoxyoxalyl-3-keto-11 - oxygenated - 4,17(20) - pregnadiene - 21 - carbonyloxy compound. Other condensation agents such as other dialkyl esters of oxalic acid, dialkyl esters of carbonic acid or alkyl esters of trifluoroacetic or formic acid can be used in place of diethyl oxalate. Other alkali-metal alkoxides such as, for example, sodium ethoxide, potassium tertiary butoxide, lithium methoxide are also operative. Reaction solvents which can conveniently be employed in the condensation include methanol, ethanol, isopropyl alcohol, tertiary butyl alcohol, tetrahydrofuran, dioxane, ether, and the like. The time necessary to obtain substantially complete reaction varies considerably between about five minutes and several days and is dependent on such factors as solvent, catalyst and temperature. Temperatures between about zero degrees centigrade and the boiling point of the reaction mixture are employed. When sodium methoxide, diethyl oxalate and tertiary butyl alcohol are employed at about fifty degrees centigrade, the reaction is usually complete in about five minutes to one hour. The alkali-metal enolate produced may be separated from the reaction mixture by addition of a large volume of an organic solvent in which the alkali-metal enolate is insoluble, such as ether, pentane, or hexane, for example. The thus-produced alkali-metal enolate, in aqueous solution, is acidified to precipitate the free enol. Thereafter, either the alkali-metal enolate or free enol is methylated by reaction with methyl iodide or methyl bromide in the presence of an alkali-metal alkylation catalyst such as sodium carbonate, sodium bicarbonate, lithium carbonate, potassium carbonate, and the like to produce the corresponding 2α-methyl-2β-ethoxyoxalyl - 3 - keto - 11 - oxygenated - 4,17(20)-pregnadiene-21-carbonyloxy compound. The methylation is conducted in an organic solvent such as, for example, acetone, methanol, ethanol, for a period of several hours, e. g., about eight to 72 hours, and at a temperature of about room temperature to the boiling point of the reaction mixture employed. Finally, the condensation step is reversed, leaving the methyl group at the 2-position and thus producing a 2α-methyl-3-keto-11 - oxygenated - 4,17(20)-pregnadiene - 21 - carbonyloxy compound II). The reversal step is conducted in methanol or other organic solvents such as ethanol, acetone, and the like, and is promoted by the presence of hydroxide or alkoxide ions. Basic alkali-metal reagents such as sodium hydroxide, potassium hydroxide, sodium methoxide, potassium ethoxide, lithium methoxide, and the like are useful in causing reversal of the condensation step. The reaction is conveniently conducted at room temperature for about two hours, but temperatures of about zero degrees centigrade to the boiling point of the reaction mixture and reaction periods of about one-half hour to 24 hours are operative. The product is isolated from the reaction mixture by conventional means such as drowning out with water and filtering or extracting with a water-immiscible solvent.

In the ketalization step, the 2-methyl-3-keto-11-oxygenated - 4,17(20) - pregnadiene - 21 - carbonyloxy compound (II) from above is admixed with an alkanediol selected from the group of vicinal alkanediols or alkane-1,3-diols containing up to and including eight carbon atoms in an organic solvent. An acid catalyst such as, for example, p-toluensulfonfic acid is added thereto and the reaction is conducted at a temperature between about twenty and about 200 degrees centigrade, preferably between about forty and about 150 degrees centigrade. The time required for the reaction is not critical and may be varied between about one and 48 hours, depending on the temperature, the ketalizing agent and catalyst employed. The ketal-forming agents of the present invention, the alkane-diols containing up to and including eight carbon atoms, preferably are vicinal alkanediols such as alkane-1,2-diols or the alkane-1,3-diols, such as, for example, ethylene glycol, propane-1,2-diol, propane-1,3-diol, butane-1,2-diol, butane-2,3-diol, pentane-1,2-diol, 3-methylpentane-1,2-diol, hexane-1,2-diol, octane-1,2-diol, and the like. Suitable solvents include benzene, toluene, xylene, methylene chloride, and the like.

In carrying out the epoxidation step, a 3-ketal of 2α-methyl - 3 - keto - 11 - oxygenated - 4,17(20) - pregnadiene - 21 - carbonyloxy steroid (III), preferably the 3-ethylene ketal of methyl 2α-methyl-3,11-diketo-4,17(20)-pregnadiene-21-oate, is epoxidized with a peracid, e. g., peracetic or perbenzoic, or other known epoxidizing agents, to produce the corresponding 5,6-oxide (IV). The reaction is conducted in an organic solvent such as, for example, chloroform, ethyl acetate, ether, benzene, and the like, at a temperature of about minus twenty to plus sixty degrees centigrade, with zero to ten degrees centigrade being preferred. The time required for the exopidation is variable, from a few minutes to several days, depending on the temperature and the epoxidizing agent used. With peracetic acid, for example, a reaction period of one-half to five hours at a temperature of zero to ten degrees centigrade is preferred. A mixture of both the α- and β-oxides is produced in this epoxidation reaction, and the mixture can be separated by chromatographic or crystallization technique known in the art.

In the oxide-opening step, a 3-ketalized 2α-methyl-3-keto-5α,6α-oxido-11-oxygenated - 17(20) - pregnane - 21-carbonyloxy steroid (IV) is reacted with hydrogen fluoride to open the oxide ring and produce the corresponding 3-ketalized 2α-methyl-3-keto-5α-hydroxy-6β-fluoro-11-oxygenated-17(20)-allopregnane-21-carbonyloxy steroid (VI). The epoxide-opening step can be performed under anhydrous or aqueous conditions in the presence or absence of a catalyst, e. g., boron trifluoride. Under anhydrous conditions temperatures between about minus forty and plus fifty degrees centigrade are generally employed, the preferred limits being between about zero and 25 degrees centigrade. If anhydrous conditions are difficult or inconvenient to maintain, the oxide-opening reaction can be performed under aqueous conditions. Thus aqueous hydrofluoric acid is admixed with a solution of the epoxide in an organic solvent such as, for example, methylene chloride, chloroform, benzene, ether, and the like. The reaction is usually complete in a period of few minutes to five hours, with one-half to two hours being the preferred reaction time. For convenience, room temperature is normally employed, but temperatures of zero to the boiling point of the mixture are operative.

When aqueous conditions are used to open the epoxide, the ketal will be hydrolyzed at the same time. The thus-produced 2α-methyl-3-keto-5α-hydroxy-6β-fluoro-11-oxygenated-17(20)-allopregnene-21-carbonyloxy steroid (V) can then be reketalized in the manner described above to produce the corresponding ketalized compound (VI).

In the reduction step of the present invention, the 3-ketalized 2α-methyl-3-keto-5α-hydroxy-6β-fluoro-11-oxygenated-17(20)-allopregnene - 21 - carbonyloxy steroid (VI), preferably the 3-ethylene ketal of a lower-alkyl, e. g., methyl, 2α-methyl-3,11-diketo-5α-hydroxy-6β-fluoro-17(20)-allopregnen-21-oate is reduced with lithium aluminum hydride or other chemical carboxyl reducing agent in an organic solvent, e. g., ether, dioxane, tetrahydrofuran, benzene, to produce the corresponding 3-ketalized 2α-methyl-5α,11β,21-trihydroxy - 6β - fluoro-17-(20)-allopregnen-3-one. At completion of this reaction, the reaction mixture is preferably mixed with water, or an acid, an ester or carbonyl agent followed by water, to decompose any excess lithium aluminum hydride and organo-metal complexes. The usual reaction conditions for a lithium aluminum hydride reduction are employed, except that reaction at room temperature or below is preferred to ensure that concomitant reaction with the 6-fluoro substituent does not occur; an acid, though operative and satisfactory under carefully controlled conditions, is preferably not employed in the decomposition step to avoid undue hydrolysis of the ketal group.

The esterification step involves the conversion of 2α-methyl - 5α,11β,21 - trihydroxy - 6β - fluoro-17(20)-allopregnen-3-one 3-alkylene ketal (VII) to the corresponding 21-acyloxy compound (VIII). This reaction can be performed under esterification conditions known in the art, e. g., by the reaction of the 21-hydroxy steroid (VII) with the selected acid halide, e. g., acid chloride or acid bromide, the anhydride of a hydrocarbon carboxylic acid, or by reaction with the selected acid, in the presence of an esterification catalyst or with an ester under ester exchange reaction conditions. Reaction conditions which are apt to affect the labile 11β-hydroxy group or 6-fluoro group should be avoided. Compounds thus produced include the 21-acyloxy compounds (VII) wherein the 17(20)-configuration is cis and Ac is the acyl radical of an organic acid, preferably a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc.

The oxidative hydroxylation of 2α-methyl-5α,11β-dihydroxy-21-acyloxy-6β-fluoro - 17(20)-allopregnen-3-one 3-alkylene ketal (VIII) to produce 2α-methyl-5α,11β,17α-trihydroxy-21-acyloxy - 6β-fluoroallopregnane-3,20-dione 3-alkylene ketal (IX) is carried out by reaction with osmium tetroxide and an oxidizing agent such as hydrogen peroxide, peracids, alkyl peroxides, amine oxide peroxides, and the like. A preferred procedure involves reaction of a 2α-methyl-5α,11β-dihydroxy-21-acyloxy-6β-fluoro-17(20)-allopregnen-3-one 3-alkylene ketal, preferably 2α-methyl - 5α,11β - dihydroxy-21-acetoxy-6β-fluoro-17(20)-allopregnen-3-one 3-ethylene ketal, with osmium tetroxide and an oxidizing agent, preferably N-methylmorpholine oxide peroxide, in an organic solvent. Tertiary butyl alcohol is the preferred solvent but other solvents such as methanol, ethanol, acetone, dioxane, and the like are operative. The reaction can be conducted either in the light or in the dark and usually at room temperature, although temperatures of ten degrees to the boiling point of the mixture are operative. The time required for the reaction is not critical and can be varied between about one and 72 hours, the length of time being dependent on the temperature and the amount of osmium tetroxide and oxidizing agent employed.

The hydrolysis step involves the hydrolysis of the ketal group of the 3-ketalized 2α-methyl-5α,11β,17α-trihydroxy-6β-fluoro-21-acyloxyallopregnane-3,20-dione (IX), preferably the ethylene ketal thereof, employing aqueous acid to produce the corresponding diketone (X). The hydrolysis is conveniently performed under relatively mild conditions, e. g., at room temperature with acetic acid or weak sulfuric acid.

The halohydrin, 2α-methyl-5α,11β,17α-trihydroxy-6β-fluoro-21-acyloxyallopregnane-3,20-dione (X), is thereupon dehydrated. Dehydration can be effected in alkali solution or in acidic solution. Suitable acid dehydrating agents include mineral acids, such as, for example, hydrochloric acid and sulfuric acid. In addition, acetic anhydride, acetic acid, p-toluenesulfonic acid, or thionyl chloride in pyridine are suitable as dehydrating agents. Basic dehydrating agents include, for example, alkali-metal hydroxides such as sodium, potassium, barium, calcium hydroxides, and the like. In the preferred embodiment of the present invention acid dehydration is employed, preferably acetic acid or hydrochloric acid.

Alternatively, hydrolysis and dehydration can be accomplished concomitantly. Thus, for example, the 3-ketalized 2α - methyl - 5α,11β,17α - trihydroxy - 6β-fluoro-21-acyloxyallopregnane-3,20-dione (IX), preferably the ethylene ketal thereof, is dissolved in chloroform, methylene chloride, ethanol, dioxane, or other convenient solvent, with chloroform being preferred, and is treated with a mineral acid. Preferably the solution containing the steroid is saturated with hydrogen chloride. The acidic mixture is then allowed to stand for a period of from a few minutes to about four hours at a temperature between about minus fifteen and plus twenty degrees centigrade to give 2α-methyl-6-fluorohydrocortisone 21-acylate (XI). To isolate this 6-fluoro steroid, the reaction mixture is washed with water and the solvent is evaporated. In the event the reaction is conducted in a water-miscible solvent, the reaction mixture is diluted with water and extracted with a water-imiscible solvent and then washed and evaporated to dryness. The resulting residue is purified by crystallization from a suitable organic solvent or by chromatography.

Compounds represented by Formula XI may be utilized either as the free 21-alcohols or as the 21-esters. If the alcohols are desired, they are obtained from the acetates by hydrolysis in accordance with known methods for hydrolyzing Compound F 21-esters to the free Compound F alcohol. A preferred procedure is to employ at least a molar equivalent of an alkali-metal bicarbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e. g., acetic acid, and the hydrolyzed product recovered from the reaction mixture by evaporation and crystallization, extraction with methylene chloride, or the like. The 21-esters, when desired, can be prepared by esterification of the 21-hydroxyls by esterification procedures hereinbefore described. The preferred 21-esters are those derived from an organic carboxylic acid, preferably a hydrocarbon carboxylic acid containing from one to twelve carbon atoms, inclusive.

The 6-fluoro compounds (XI) of the present invention contain either an 11-hydroxyl or an 11-ketone. The 11-hydroxy compounds can be oxidized to the corresponding 11-keto compounds, i. e., 2α-methyl-6-fluorocortisone or the 21-acylates thereof, with an oxidizing agent. Oxidizing agents such as chromic acid, potassium dichromate, a haloamide, and the like are operative. The oxidation can be carried out by a variety of methods, such as, for example, by oxidizing the said 6-fluoro steroid in acetic acid solution with chromium trioxide, using molar quantities or a slight excess, such as from ten to thirty percent excess, or by oxidizing with a haloamide or imide of an acid, such as N-bromoacetamide, N-chlorosuccin imide, or N-bromosuccinimide dissolved in pyridine, dioxane, or other suitable solvents. At the conclusion of the desired oxidation reaction, the excess oxidant is generally destroyed by addition of methyl alcohol, ethyl alcohol, and the like for the chromic acid oxidant or a bisulfate for N-bromoacetamide, N-bromosuccinimide and other N-haloacylamides and imides. Thereafter, the resulting 2α - methyl - 6 - fluoro - 21 - acyloxy - 4 - pregnene-3,11,20-trione is recovered by conventional means, such as by dilution with water and extraction with water-immiscible solvents, e. g., methylene chloride, ether, benzene, toluene, or the like.

The compounds represented by Formula XI, in addition to possessing the valuable anti-rheumatoid arthritic, anti-inflammatory and glucocorticoid activity heretofore mentioned, are useful as intermediates for the preparation of (1) the 21-desoxy and 21-fluoro analogues, namely, 2α - methyl - 6 - fluoro - 11β,17α - dihydroxy - 4 - pregnene - 3,20 - dione, 2α - methyl - 6 - fluoro - 17α - hydroxy - 4 - pregnene - 3,11,20 - trione, 2α - methyl-6,21 - difluoro - 11β,17α - dihydroxy - 4 - pregnene - 3,20-dione, and 2α-methyl-6,21-difluoro-17α-hydroxy-4-pregnene-3,11,20-trione; (2) the 9α-halo analogues, namely, 2α - methyl - 6 - fluoro - 9α - halo - 11β,17α, 21 - trihydroxy - 4 - pregnene - 3,20 - dione and 2α - methyl-6 - fluoro - 9α -halo - 17α,21 - dihydroxy - 4 - pregnene-3,11,20-trione and the 21-esters thereof; (3) the 9α-halo-21-desoxy and 9α-halo-21-fluoro analogues, namely, 2α-methyl - 6 - fluoro - 9α - halo - 11β,17α - dihydroxy - 4-pregnene - 3,20 - dione, 2α - methyl - 6 - fluoro - 9α-halo - 17α - hydroxy - 4 - pregnene - 3,11,20 - trione, 2α - methyl - 6,21 - difluoro - 9α - halo - 11β,17α - dihydroxy-4-pregnene-3,20-dione, and 2α-methyl-6,21-difluoro - 9α - halo - 17α - hydroxy - 4 - pregnene - 3,11,20-trione; (4) the 1-dehydro analogues, namely, 2α-methyl-6 - fluoro - 11β,17α,21 - trihydroxy - 1,4 - pregnadiene-3,20-dione and 2α-methyl-6-fluoro-17α,21-dihydroxy-1,4-pregnadiene-3,11,20-trione and the 21-esters thereof; (5) the 1-dehydro-21-desoxy and 1-dehydro-21-fluoro analogues, namely, 2α-methyl-6-fluoro-11β,17α-dihydroxy-1,4 - pregnadiene - 3,20 - dione, 2α - methyl - 6 - fluoro- 17α - hydroxy - 1,4 - pregnadiene - 3,11,20 - trione, 2α - methyl - 6,21 - difluoro - 11β,17α - dihydroxy - 1,4-pregnadiene-3,20-dione, and 2α-methyl-6,21-difluoro-17α-hydroxy-1,4-pregnadiene-3,11,20-trione; (6) the 1-dehydro-9α-halo analogues, namely, 2α-methyl-6-fluoro-9α-halo - 11β,17α,21 - trihydroxy - 1,4 - pregnadiene - 3,20-dione, and 2α-methyl-6-fluoro-9α-halo-17α,21-dihydroxy-1,4-pregnadiene-3,11,20-trione and the 21-esters thereof; (7) the 1-dehydro-9α-halo-2-desoxy and 1-dehydro-9α-halo-21-fluoro analogues, namely, 2α-methyl-6-fluoro-9α-halo - 11β,17α - dihydroxy - 1,4 - pregnadiene - 3,20-dione, 2α - methyl - 6 - fluoro - 9α - halo - 17α -hydroxy-1,4 - pregnadiene - 3,11,20 - trione, 2α - methyl -6,21-difluoro - 9α - halo - 11β,17α - dihydroxy - 1,4 - pregnadiene-3,20-dione, and 2α-methyl-6,21-difluoro-9α-halo-17α-hydroxy-1,4-pregnadiene-3,11,20-trione. These compounds, the 21-desoxy, 21-fluoro, 9α-halo, 9α-halo-21-desoxy, 9α-halo-21-fluoro, 1-dehydro, 1-dehydro-21-desoxy, 1-dehydro-21-fluoro, 1-dehydro-9α-halo, 1-dehydro-9α-halo-21-desoxy, and 1-dehydro-9α-halo-21-fluoro and the 21-esters of the 21-hydroxy compounds above also possess the valuable anti-rheumatoid arthritic, anti-inflammatory and glucocorticoid activity of the parent 6-fluoro compounds, usually in higher degree. They possess a combination of high anti-inflammatory and glucocorticoid activities with favorable mineralocorticoid properties.

In the preparation of the 21-desoxy and 21-fluoro analogues of the 6-fluoro compounds represented by Formula XI, 2α-methyl-6-fluorohydrocortisone or 2α-methyl-6-fluorocortisone is converted to the 21-methanesulfonate by treatment with methanesulfonyl chloride in pyridine at about zero to twenty degrees centigrade for a period of about thirty minutes to 24 hours. The resulting 21-methanesulfonate is isolated by drowning out with water and filtering when the product is crystalline, or by extracting with a water-immiscible solvent such as, methylene chloride, when the 21-methanesulfonate is not a solid. Treatment of the 21-methanesulfonate with potassium fluoride by refluxing in dimethylsulfoxide for a period of about one to 24 hours is productive of the corresponding 21-fluoro compounds, i. e., 2α-methyl-6,21-difluoro-11β,17α-dihydroxy-4-pregnene - 3,20 - dione and 2α-methyl-6,21 - difluoro - 17α - hydroxy - 4 - pregnene-3,11,20-trione, which can be isolated by drowning out with water and filtering or extracting with a water-immiscible solvent when necessary. The compounds can be purified by recrystallization from acetone, if desired. Treatment of the 21-methanesulfonate with sodium iodide by refluxing in acetone for a few minutes results in replacement of the methanesulfonate radical with iodine. The 21-iodide thus produced is isolated by removal of the solvent and is treated with sodium thiosulfate in acetic acid for a period of about fifteen minutes to three hours to produce the corresponding 21-desoxy compounds, i. e., 2α-methyl-6 - fluoro - 11β,17α - dihydroxy-4 - pregnene - 3,20 - dione and 2α - methyl - 6 - fluoro-17α - hydroxy - 4 - pregnene - 3,11,20 - trione, which can be isolated and purified by conventional means. Alternatively, the 11-keto-21-fluoro and 11-keto-21-desoxy compounds above can be prepared from the corresponding 11β-hydroxy compounds by chromic acid in acetic acid oxidation.

The 9α-halo, 9α-halo-21-desoxy, and 9α-halo-21-fluoro analogues of the 6-fluoro compounds represented by Formula XI are conveniently prepared, for example, by dehydrating 2α-methyl-6-fluorohydrocortisone 21-acetate (XI) with N-bromoacetamide and anhydrous sulfur dioxide in pyridine until a negative acidified potassium iodide-stach test of the reaction mixture is obtained. Dilution with water results in precipitation of 2α-methyl-6-fluoro-17α-hydroxy-21-acetoxy - 4,9(11) - pregnadiene-3,20-dione, which can be purified by recrystallization from acetone. The crystalline product can then be reacted in methylene chloride-tertiary butyl alcohol solution with perchloric acid and N-bromoacetamide or N-iodoacetamide to produce a reaction mixture from which 2α - methyl - 6 - fluoro - 9α - bromo - 11β,17α-dihydroxy-21 - acetoxy - 4 - pregnene - 3,20 - dione or the corresponding 9-iodo compound, respectively, can be recovered by precipitation with water and recrystallization from acetone. The latter compounds can be reacted in acetone solution with anhydrous potassium acetate at reflux temperature to produce 2α - methyl - 6 - fluoro-9β,11β - oxido - 17α - hydroxy - 21 - acetoxy-4-pregnene-3,20-dione, which is recoverable from the reaction mixture by dilution with water and can be purified by chromatography and recrystallization from acetone-Skellysolve B hexanes mixture. Reaction of this oxide in methylene chloride solution with aqueous hydrogen fluoride at room temperature or with anhydrous hydrogen fluoride at lower temperatures, e. g., minus twenty to plus twenty degrees centigrade, is productive of 2α-methyl - 6,9α - difluoro - 11β,17α-dihydroxy-21-acetoxy-4-pregnene-3,20-dione. Substitution of hydrogen chloride for hydrogen fluoride above is productive of 2α-methyl - 6 - fluoro - 9α - chloro - 11β,17α - dihydroxy-21-acetoxy - 4 - pregnene - 3,20 - dione. Oxidation of the said 9α-fluoro and 9α-chloro compounds with chromic acid in acetic acid is productive of the corresponding 11-keto compounds, 2α - methyl - 6,9α - difluoro - 17α - hydroxy - 21 - acetoxy - 4 - pregnene - 3,11,20 - trione and 2α - methyl - 6 - fluoro - 9α - chloro - 17α - hydroxy - 21-acetoxy-4-pregnene-3,11,20-trione, respectively.

In the above sequence of reactions, 2α-methyl-6-fluorohydrocortisone 21-acetate (XI) was illustratively converted to the corresponding 9α-halo compounds. In the same manner other 21-esters of 2-methyl-6-fluorohydrocortisone may be used as the starting material. Preferred esters are those wherein the acyl radical is that of an organic carboxylic acid, preferably a hydrocarbon carboxylic acid containing from one to twelve carbon atoms, inclusive. The ester group of any selected 21-acyloxy starting material will remain throughout the sequence of reactions as illustrated with regard to the acetate, thus being productive of the selected 21-acetate intermediate compounds corresponding to the 21-acetoxy compounds indicated.

The foregoing compounds, 2α-methyl-6-fluoro-9α-halo-11β,17α - dihydroxy - 21 - acyloxy - 4 - pregnene - 3,20-dione, and 2α - methyl - 6 - fluoro - 9α - halo - 17α-hydroxy - 21 - acyloxy - 4 - pregnene - 3,11,20 - trione, can be hydrolyzed to the corresponding 21-hydroxy compounds according to known methods for hydrolyzing Compound F 21-acetate to Compound F, for example, in aqueous methanolic solution with potassium bicarbonate under oxygen-free conditions. The 21-hydroxy compounds, 2α - methyl - 6,9α - difluoro - 11β,17α,21 - trihydroxy - 4 - pregnene - 3,20 - dione, 2α - methyl - 6,9α-difluoro - 17α,21 - dihydroxy - 4 - pregnene - 3,11,20-trione, 2α - methyl - 6 - fluoro - 9α - chloro - 11β,17α,21-trihydroxy - 4 - pregnene - 3,20 - dione, and 2α - methyl-6 - fluoro - 9α - chloro - 17α,21 - dihydroxy - 4-pregnene-3,11,20 - trione, thus produced can be converted to the corresponding 21-desoxy and 21-fluoro compounds, e. g., 2α - methyl - 6,9α - difluoro - 11β,17α - dihydroxy - 4-pregnene - 3,20 - dione, 2α - methyl - 6,9α,21 - trifluoro-11β,17α - dihydroxy - 4 - pregnene - 3,20 - dione, 2α-methyl - 6,9α - difluoro - 17α - hydroxy - 4 - pregnene-3,11,20 - trione, 2α - methyl - 6,9α,21 - trifluoro - 17α-hydroxy - 4 - pregnene - 3,11,20 - trione, and the corresponding 9α-chloro compounds, by procedures hereinabove described for the conversion of 2α - methyl - 6-fluorohydrocortisone and 2α - methyl - 6 - fluorocortisone to the corresponding 21-desoxy and 21-fluoro analogues.

In the preparation of the 1-dehydro compounds, i. e., 1-dehydro-21-desoxy, 1-dehydro-21-fluoro, 1-dehydro-9α-halo, 1-dehydro-9α-halo-21-desoxy, and 1-dehydro-9α-halo-21-fluoro compounds, 2α-methyl-6-fluorohydrocortisone or 2α-methyl-6-fluorocortisone of the class of Formula IV, are microbiologically dehydrogenated with Septomyxa affinis, A. T. C. C. 6737, to give the corresponding 1-dehydro compounds, 1-dehydro-2α-methyl-6-fluorohydrocortisone and 1-dehydro-2α-methyl-6-fluorocortisone. The 1-dehydro compounds above are converted to the corresponding 21-desoxy and 21-fluoro compounds, 2α - methyl-6-fluoro-11β,17α-dihydroxy-1,4-pregnadiene-3,20-dione, 2α-methyl-6-,21-difluoro-11β,17α-dihydroxy-1,4-pregnadiene-3,20 - dione, 2α - methyl-6-fluoro-17α-hydroxy-1,4-pregnadiene-3,11,20 - trione, and 2α - methyl - 6,21-difluoro-17α-hydroxy-1,4-pregnadiene-3,11,20-trione, by procedures hereinabove described for the conversion of 2α-methyl-6-fluorohydrocortisone to the corresponding 21-desoxy and 21-fluoro analogues. The 1-dehydro-2α-methyl-6-fluorohydrocortisone and 1-dehydro-2α-methyl-6-fluorocortisone can be acetylated with acetic anhydride in pyridine to give the corresponding 21-acetates, 1-dehydro-2α-methyl-6-fluorohydrocortisone 21-acetate and 1-dehydro-2α-methyl-6-fluorocortisone 21-acetate, respectively. The 1-dehydro-2α-methyl-6-fluorohydrocortisone acetate can be dehydrated with N-bromoacetamide and anhydrous sulfur dioxide until a negative acidified potassium iodide-starch test of the reaction mixture is obtained. Dilution with cold water, e. g., ice water, results in the precipitation of 2α-methyl-6-fluoro-17α-hydroxy - 21 - acetoxy-1,4,9,(11)-pregnatriene-3,20-dione, which can be purified by recrystallization from acetone. The crystalline product can then be reacted in methylene chloride-tertiary butyl alcohol solution with perchloric acid and N-bromoacetamide or N-iodosuccinimide to produce a reaction mixture from which 2α-methyl-6-fluoro-9α-bromo-11β,17α-dihydroxy-21-acetoxy-1,4-pregnadiene-3,20-dione or the corresponding 9α-iodo compound, respectively, can be recovered by precipitation with ice water and recrystallization from acetone. The latter compounds can be reacted in acetone solution with anhydrous potassium acetate at reflux temperature to produce 2α - methyl-6-fluoro-9β,11β-oxido-17α-hydroxy-21-acetoxy-1,4-pregnadiene-3,20-dione, which is recoverable from the reaction mixture by dilution with water and can be purified by chromatography and recrystallization from a Skellysolve B hexanes-acetone mixture. Reaction of the latter in methylene chloride solution with aqueous hydrogen fluoride at room temperature or with anhydrous hydrogen fluoride at lower temperatures, e. g., minus twenty to plus twenty degrees centigrade, is productive of 2α - methyl-6,9α-difluoro-11β,17α-dihydroxy-21-acetoxy-1,4-pregnadiene-3,20-dione. Substitution of aqueous hydrogen chloride for hydrogen fluoride is productive of 2α-methyl - 6 - fluoro-9α-chloro-11β,17α-dihydroxy-21-acetoxy-1,4-pregnadiene-3,20-dione. Oxidation of the said 9α-fluoro and 9α-chloro compounds with chromic acid in acetic acid is productive of the corresponding 11-keto compounds, 2α-methyl-6,9α-difluoro-17α-hydroxy-21-acetoxy-1,4-pregnadiene-3,11,20-trione and 2α-methyl-6-fluoro-9α-chloro-17α-hydroxy-21-acetoxy-1,4 - pregnadiene-3,11,20-trione, respectively.

In the above sequence of reactions 1-dehydro-2-methyl-6-fluorohydrocortisone 21-acetate (IV) was illustratively converted to the 9α-halo compounds. In the acylation step of the above sequence of reactions, acetic anhydride was utilized illustratively to produce the 21-acetate of 1-dehydro-2α-methyl-6-fluorohydrocortisone. In the same manner other acylating agents can be used to esterify 1-dehydro-2α-methyl-6-fluorohydrocortisone to produce the corresponding 21-ester. Preferred esters are those wherein the acyl radical is that of an organic carboxylic acid, preferably a hydrocarbon carboxylic acid containing from one to twelve carbon atoms, inclusive. The ester group of any selected 21-acyloxy starting material will remain throughout the sequence of reactions as illustrated with regard to the acetate, being thus productive of the selected 21-acylate intermediate compounds corresponding to the 21-acetoxy intermediates shown.

The foregoing compounds, 2α-methyl-6-fluoro-9α-halo-11β,17α - dihydroxy - 21 - acyloxy-1,4-pregnadiene-3,20-dione, and 2α-methyl-6-fluoro-9α-halo-17α-hydroxy-21-acyloxy-1,4-pregnadiene-3,11,20-trione, are hydrolyzed to the corresponding 21-hydroxy compounds according to known methods for hydrolyzing Compound F 21-acetate to Compound F, for example, in aqueous methanolic solution with potassium bicarbonate under oxygen-free conditions. The 21-hydroxy compounds, 2α-methyl-6,9α-difluoro-11β,17α,21 - trihydroxy-1,4-pregnadiene-3,20-dione, 2α - methyl - 6,9α - difluoro-17α,21-dihydroxy-1,4-pregnadiene-3,11,20-trione, 2α - methyl - 6 - fluoro-9α-chloro-11β,17α,21-trihydroxy-1,4-pregnadiene-3,20-dione, and 2α-methyl - 6 - fluoro-9α-chloro-17α,21-dihydroxy-1,4-pregnadiene-3,11,20-trione, are converted to the corresponding 21-desoxy and 21-fluoro compounds, e. g., 2α-methyl-6,9α-difluoro - 11β,17α - dihydroxy-1,4-pregnadiene-3,20-dione, 2α-methyl-6,9α,21-trifluoro-11β,17α-dihydroxy - 1,4 - pregnadiene-3,20-dione, 2α-methyl-6,9α-difluoro-17α-hydroxy-1,4-pregnadiene - 3,11,20-trione, 2α-methyl-6,9α,21-trifluoro-17α-hydroxy-1,4-pregnadiene-3,11,20 - trione, and the corresponding 9α-chloro compounds, by procedures hereinabove described for the conversion of 2α-methyl-6-fluorohydrocortisone to the corresponding 21-desoxy and 21-fluoro analogues, e. g., by preparation of the 21-methanesulfnate with methanesulfonyl chloride in pyridine, followed by replacement of the methanesulfonate radical with fluorine by treatment with potassium fluoride, or replacement of the methanesulfonate radical with hydrogen by treatment with sodium iodide followed by sodium thiosulfate.

The compounds represented by Formula XI and their 21 - desoxy, 21 - fluoro, 9α-halo, 9α - halo - 21 - desoxy, 9α - halo - 21 - fluoro, 1 - dehydro, 1 - dehydro - 21-desoxy, 1-dehydro-21-fluoro, 1-dehydro-9α-halo 1-dehydro - 9α - halo - 21-desoxy, and 1-dehydro-9α-halo-21-fluoro analogues, are all characterized by the presence of a 6-fluoro substituent, which can exist in either the 6α- or 6β-epimeric form. The foregoing processes produce a mixture in which both the 6β- and 6α-forms are present. The 6α-epimer can be separated from the products by chromatographic or fractional crystallization techniques known in the art. The compounds are useful, however, as such in the mixtures as produced in the synthesis steps described. It is occasionally desirable, nevertheless, to produce from the mixture by separation or by epimerization the 6α-epimer. Conversion of the 6β-epimer or mixture predominating therein can be accomplished by treatment at temperatures of zero degrees centigrade or slightly below in an organic solvent, such as chloroform, methylene chloride, ether, and the like, and in the presence of a prototropic agent (a proton-donating reagent) such as water, alcohols, organic acids, and the like, with a mineral acid, such as hydrochloric acid. The mixture should be maintained at temperatures below zero degrees centigrade, or at least below room temperature, during the addition of the acid. The reaction mixture can then be washed with successive portions of dilute alkali and water, and then dried and evaporated under reduced pressure. The 6α-fluoro products can be recovered from the crude reaction mixture and purified by recrystallization.

Alternatively, the epimerization can be accomplished with an alkali. Bases such as, for example, solutions of sodium hydroxide and potassium hydroxide may be used to treat the 6β-epimer in solution in an organic solvent, such as, for example, methanol to produce the 6α-epimer.

The following examples are illustrative of the process and products of the present invention, but are not to be construed as limiting.

EXAMPLE 1

*Methyl 2α-methyl-3,11-diketo-4,17(20)-pregnadien-21-oate*

(1) GLYOXALATION OF METHYL 3,11-DIKETO-4,17(20)-PREGNADIEN-21-OATE

A solution of 178 grams of methyl 3,11-diketo-4,17-

(20)-pregnadien-21-oate in 5.5 liters of t-butyl alcohol was prepared by warming to seventy degrees centigrade. The solution was then cooled to 55 degrees centigrade. The reaction flask was purged with nitrogen, and 219 grams of diethyl oxalate and 54 grams of sodium methoxide (as a 25 percent solution in methanol) were added. After ten minutes the sodium enolate salt started to precipicate, and reaction was complete in forty minutes. The reaction mixture, after cooling to 25 degrees centigrade, was diluted with three liters of anhydrous ether and filtered to give 218 grams of the sodium enolate of methyl 2-ethoxyoxalyl-3,11-diketo-4,17(20)-pregnadien-21-oate as a yellow powder.

(2) ENOL FORMATION

The sodium enolate from above was converted to the free enol by dissolving in three liters of water and acidifying with five percent sulfuric acid solution. The resulting solid material was isolated by filtration and was washed with water and dried to give 172 grams (as a yellow powder) of methyl 2-ethoxyoxalyl-3,11-diketo-4,17-(20)-pregnadien-21-oate as the free enol.

(3) METHYLATION

Fifty grams of the free enol from above was dissolved in 1.6 liters of acetone, and to this solution was added sixty milliliters of methyl iodide and 81 grams of potassium carbonate. After stirring and heating at reflux for twenty hours, the reaction mixture was filtered to remove inorganic salts, and the filtrate was evaporated to dryness under reduced pressure to give 2α-methyl-2-ethoxy-oxalyl-3,11-diketo-4,17(20)-pregnadien-21-oate as a dark brown residue.

(4) GLYOXALATE REMOVAL

The glyoxalate moiety was removed by dissolving the residue from above in 1.2 liters of methanol and adding 21 milliliters of a 25 percent solution of sodium methoxide in methanol thereto. After standing at twenty to 25 degrees centigrade for two hours, the reaction mixture was poured into 2.5 liters of water in which fifty grams of sodium chloride had been dissolved. The resulting crystalline precipitate was collected by filtration and dried to give thirty grams of light brown powder, which was dissolved in 200 milliliters of methylene chloride and chromatographed over 1500 grams of synthetic magnesium silicate (Florisil). The column was eluted with eighteen fractions of five percent acetone in Skellysolve B hexanes. Fractions five to thirteen contained the product which on crystallization from methanol gave 9.9 grams of methyl 2α-methyl-3,11-diketo-4,17(20)-pregnadien-21-oate of melting point 138 to 140 degrees centigrade and having a rotation of $[\alpha]_D$ plus 148 degrees (chloroform) and the following analysis:

*Analysis.*—Calculated for $C_{23}H_{30}O_4$: C, 74.50; H, 8.16. Found: C, 74.05; H, 8.28.

EXAMPLE 2

*Methyl 2α-methyl-3,11-diketo-4,17(20)-pregnadien-21-oate 3-ethylene ketal*

A mixture of 9.9 grams of methyl 2α-methyl-3,11-diketo-4,17(20)-pregnadien-21-oate, 0.5 gram of p-toluene-sulfonic acid monohydrate, 100 milliliters of distilled ethylene glycol and 1.6 liters of benzene was heated under reflux, with vigorous stirring, for a period of twenty hours. The water formed in the reaction was co-distilled with the benzene and removed in a water trap. The reaction mixture was then cooled, two milliliters of pyridine added thereto, and washed with water and saturated sodium bicarbonate solution. After drying over anhydrous sodium sulfate, the solvent was removed by distillation under reduced pressure. The residue was crystallized from methanol and gave 6.1 grams of methyl 2α-methyl-3,11-diketo-4,17(20)-pregnadien-21-oate 3-ethylene ketal, melting point 208 to 216 degrees centigrade. An analytical sample melted at 220 to 224 degrees centigrade and had a rotation of $[\alpha]_D$ minus seventeen degrees (chloroform).

*Analysis.*—Calculated for $C_{25}H_{34}O_5$: C, 72.50; H, 8.28. Found: C, 72.66; H, 8.50.

Following the above procedure, substituting other dihydric alcohols for ethylene glycol, for example, 1,2-hydric glycol, 2,3-butanediol, 1,3-butanediol and 2,3-pentanediol, is productive of the respective 3-alkylene ketals of methyl 2α-methyl-3,11-diketo-4,17(20)-pregnadien-21-oate.

EXAMPLE 3

*Methyl 2α-methyl-3,11-diketo-5α,6α-oxido-17(20)-allopregnen-21-oate 3-ethylene ketal*

A mixture of 11.3 milliliters of forty percent peracetic acid and 1.13 grams of sodium acetate was cooled to approximately zero degrees centigrade in an ice-salt bath and was stirred while a solution of five grams of methyl 2α - methyl - 3,11 - diketo - 4,17(20) - pregnadien - 21 - oate 3-ethylene ketal in 100 milliliters of chloroform was added slowly over a period of fifteen minutes so that the temperature of the reaction mixture did not exceed five degrees centigrade. The reaction mixture was stirred for two hours at zero degrees centigrade, then the aqueous layer containing excess peracetic acid was separated and the chloroform solution was washed with water, then with saturated aqueous sodium bicarbonate, and again with water. To insure removal of any peroxides present, the thus-obtained chloroform solution was diluted with 120 milliliters of methanol. Fifty milliliters of 0.1 Normal aqueous sodium hydroxide was added and the mixture was stirred for 45 minutes. After addition of 200 milliliters of water, the chloroform layer was separated, washed with water, and dried over anhydrous sodium sulfate. The thus-obtained chloroform solution was concentrated to dryness by distillation in vacuo from a water bath at sixty degrees centigrade, giving a white crystalline residue which was recrystallized two times from acetone to give 3.53 grams of methyl 2α-methyl-3,11-diketo-5α,6α-oxido - 17(20) - allopregnen - 21 - oate 3 - ethylene ketal as white cubes having a melting point of 278 to 282 degrees centigrade, a rotation of $[\alpha]_D$ minus 46 degrees (chloroform), and the folowing analysis:

*Analysis.*—Calculated for $C_{25}H_{34}O_6$: C, 69.80; H, 7.91. Found: C, 69.24; H, 8.36.

The acetone mother liquors from the methyl 2α-methyl-3,11 - diketo - 5α,6α - oxido - 17(20) - allopregnen - 21-oate 3-ethylene ketal crystallization were concentrated to give a crop which was recrystallized from acetone to give 0.54 gram of methyl 2α-methyl-3,11-diketo-5β,6β-oxido-17(20)-allopregnen-21-oate 3-ethylene ketal as white needles having a melting point of 255 to 257 degrees centigrade.

EXAMPLE 4

*Methyl 2α-methyl-3,11-diketo-5α-hydroxy-6β-fluoro-17(20)-allopregnen-21-oate*

A solution of 3.53 grams of methyl 2α-methyl-3,11-diketo-5α,6α-oxido-17(20)-allopregnen-21-oate 3-ethylene ketal in fifty milliliters of methylene chloride was placed in a polyethylene bottle and fifteen milliliters of 48 percent aqueous hydrofluoric acid was added. The resulting mixture was stirred vigorously for one hour at room temperature and then was poured into 500 milliliters of water. Excess hydrofluoric acid was neutralized by addition of sodium bicarbonate, and the methylene chloride layer was separated. The aqueous layer was washed with twenty milliliters of methylene chloride. The methylene chloride solutions were combined, dried over anhydrous sodium sulfate, and chromatographed over 200 grams of Florisil synthetic magnesium silicate. The column was eluted with 200-milliliter fractions of fifteen percent acetone in Skellysolve B hexanes. The material eluated in fractions five to eleven, inclusive, was recrystallized from a mixture of acetone and Skellysolve B hexanes to give 0.38 gram of methyl 2α-methyl-3,11-diketo-5α-hydroxy-6β - fluoro - 17(20) - allopregnen - 21 - oate having a melting point of 277 to 279 degrees centigrade, a rotation of $[\alpha]_D$ zero degrees in chloroform, an ultraviolet absorption maximum $a_M$ of 15,975 at 220 millimicrons in 95 percent ethanol, and the folowing analysis:

Analysis.—Calcd. for $C_{21}H_{31}O_5F$: C, 68.00; H, 7.70; F, 4.68. Found: C, 68.12; H, 7.98; F, 4.40.

EXAMPLE 5

*Methyl 2α-methyl-3,11-diketo-5α-hydroxy-6β-fluoro-17(20)-allopregnen-21-oate 3-ethylene ketal*

A mixture of 3.4 grams of methyl 2α-methyl-3,11-diketo - 5α - hydroxy - 6β - fluoro - 17(20) - allopregnen-21-oate, fifty milliliters of redistilled ethylene glycol, 0.25 gram of p-toluenesulfonic acid monohydrate and 500 milliliters of benzene was stirred and refluxed for six hours during which time water was removed by means of a Dean-Starke water trap. The reaction mixture was then cooled to room temperature and 0.25 milliliter of pyridine was added. The resulting solution was washed with water, five percent aqueous sodium bicarbonate, and water and then was dried over anhydrous sodium sulfate and concentrated to dryness in vacuo, giving a quantitative yield of methyl 2α-methyl-3,11-diketo-5α-hydroxy-6β-fluoro - 17(20) - allopregnen - 21 - oate. The infrared absorption spectrum was in agreement with the desired structure.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of methyl 2α - methyl - 3,11 diketo - 5α - hydroxy - 6β-fluoro-17(20)-allopregnen-21-oate.

EXAMPLE 6

*2α-methyl-5α,11β,21-trihydroxy-6β-fluoro-17(20)-allopregnen-3-one 3-ethylene ketal*

A solution of 3.77 grams of methyl 2α-methyl-3,11-diketo - 5α - hydroxy - 6β - fluoro - 17(20) - allopregnen-21-oate 3-ethylene ketal in 175 milliliters of ether was added to a solution of 1.7 grams of lithium aluminum hydride in 400 milliliters of ether and stirred at 25 to thirty degrees centigrade for one hour. Then 25 milliliters of ethyl acetate was added slowly, followed by cautious addition of fifty milliliters of distilled water. The ether solution was separated from the resulting mixture by decantation, and then was concentrated in vacuo at below fifty degrees centigrade to give crude 2α-methyl-5α,11β,21-trihydroxy - 6β - fluoro - 17(20) - allopregnen - 3 - one 3-ethylene ketal as a white powder.

EXAMPLE 7

*2α-methyl-5α,11β,21-trihydroxy-6β-fluoro-17(20)-allopregnen-3-one 3-ethylene ketal 21-acetate*

The acetate was prepared by allowing 3.7 grams of 2α-methyl - 5α,11β,21 - trihydroxy-6β-fluoro-17(20)-allopregnen-3-one 3-ethylene ketal to stand sixteen hours in five milliliters of acetic anhydride and twenty milliliters of pyridine. The solution was then poured into ice water to give 3.65 grams of 2α-methyl-5α,11β,21-trihydroxy - 6β - fluoro-17(20)-allopregnen-3-one 3-ethylene ketal 21-acetate, melting point 184 to 185 degrees centigrade.

Similarly, other 21-organic carboxylic esters of 5α,11β,21 - trihydroxy - 6β - fluoro-17(20)-allopregnen-3-one 3-ethylene ketals are prepared wherein Ac is the acyl radical of an organic carboxylic acid, preferably a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentyl- formic, cyclopentylacetic, β-cyclohexylpropionic, cyclohexylformic, cyclohexylacetic, β-cyclohexylpropionic, an aryl or alkaryl acid, e. g., benzoic, 2-, 3-, or 4-methylbenzoic, 2,3-, 2,4-, 2,5- 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc.

EXAMPLE 8

*2α-methyl-5α,11β,17α,21-tetrahydroxy-6β-fluoro-allopregnane-3,20-dione 3-ethylene ketal 21-acetate*

To a solution of 3.65 grams of 2α-methyl-5α,11β,21-trihydroxy-6β-fluoro-17(20)-allopregnen-3-one 3-ethylene ketal 21-acetate in 180 milliliters of tertiary butyl alcohol was added 5.2 milliliters of pyridine, seventy milligrams of osmium tetroxide, and 10.75 milliliters of a solution of N-methylmorpholine oxide peroxide in tertiary butyl alcohol. The latter solution required for titration 41.3 milliliters of 0.1 normal sodium thiosulfate per milliliter of solution. The reaction mixture was protected from light and stirred for sixteen hours at room temperature. At the end of the reaction period eighty milliliters of 0.5 percent aqueous sodium hydrosulfite was added to the reaction mixture, which was then stirred for eighty minutes and filtered through a bed of diatomaceous earth. The filtrate was concentrated in vacuo at below fifty degrees centigrade until no tertiary butyl alcohol remained in the mixture and then was cooled to five degrees centigrade and filtered to give 1.24 grams of 2α-methyl-5α,11β,17α,21 - tetrahydroxy - 6β - fluoroallopregnane-3,20-dione 3-ethylene ketal 21-acetate having a melting point of 262 to 264 degrees centigrade, a rotation of $[\alpha]_D$ plus 33 degrees in chloroform, and the following analysis:

Analysis.—Calcd. for $C_{26}H_{39}O_8F$: C, 62.70; H, 7.89; F, 3.82. Found: C, 63.07; H, 8.08; F, 3.44.

The filtrate from the crystallization of the 2α-methyl-5α,11β,17α,21 - tetrahydroxy - 6β - fluoroallopregnane-3,20-dione 3-ethylene ketal 21-acetate was extracted with methylene chloride. The extract was dried over sodium sulfate and chromatographed over 200 grams of Florisil synthetic magnesium silicate. Elution of the column with fifteen percent acetone in Skellysolve B hexanes gave 0.44 gram of product, which on crystallization from a mixture of ethyl acetate and Skellysolve B hexanes gave 0.39 gram of 2α-methyl-5α,11β,17α,21-tetrahydroxy-6β-fluoroallopregnane-3,20-dione 3-ethylene ketal 21-acetate having a melting point of 252 to 255 degrees centigrade.

EXAMPLE 9

*2α-methyl-5α,11β,17α,21-tetrahydroxy-6β-fluoro-allopregnane-3,20-dione 21-acetate*

A solution of 0.5 gram of 2α-methyl-5α,11β,17α,21-tetrahydroxy-6β-fluoroallopregnane-3,20-dione 3-ethylene ketal 21-acetate in 35 milliliters of acetone and four milliliters of 1 normal sulfuric acid solution was greatly boiled on the steam bath for ten minutes, cooled and neutralized with dilute aqueous sodium bicarbonate. Addition of water and cooling gave a crystalline precipitate of 2α-methyl-5α,11β,17α-trihydroxy-6β-fluoro-21-acetoxy-allopregnane-3,20-dione.

EXAMPLE 10

*2α - methyl - 6β - fluoro-11β,17α-dihydroxy-21-acetoxy-4-pregnene - 3,20 - dione (2α - methyl - 6β - fluorohydrocortisone acetate)*

A solution of 100 milligrams of 2α-methyl-5α,11β,17α-trihydroxy - 6β - fluoro-21-acetoxyallopregnane-3,20-dione in 4.9 milliliters of acetic acid and 0.1 milliliter of water was refluxed for a period of one hour and evaporated to dryness under reduced pressure. Crystallization of the residue from acetone-Skellysolve B hexanes gave 2α-methyl - 6β - fluoro-11β,17α-dihydroxy-21-acetoxy-4-pregnene-3,20-dione (2α-methyl-6β-fluorohydrocortisone acetate). Chromatography of the mother liquor and crystallization from acetone-Skellysolve B hexanes gave a small amount of the 6α-fluoro epimer.

EXAMPLE 11

2α - methyl - 6α - fluoro-11β,17α-dihydroxy-21-acetoxy-4-pregnene-3,20-dione (2α-methyl-6α-fluorohydrocortisone acetate)

A solution of 1.63 grams of 2α-methyl-5α,11β,17α,21-tetrahydroxy - 6β - fluoroallopregnane - 3,20 - dione 3-ethylene ketal 21-acetate and 1.65 milliliters of absolute ethanol in 165 milliliters of chloroform was maintained at minus five to minus ten degrees centigrade for 2.5 hours while hydrogen chloride gas was bubbled through the solution. The reaction mixture was then poured into 300 milliliters of ice and saturated aqueous sodium bicarbonate. The organic layer was separated, washed with aqueous sodium bicarbonate, then with water, and was dried over anhydrous sodium sulfate. The thus-obtained solution was chromatographed over 140 grams of Florisil synthetic magnesium silicate. Elution with twenty percent acetone in Skellysolve B hexanes gave 1.23 grams of product which was recrystallized from aqueous methanol to give one gram of 2α-methyl-6α-fluorohydrocortisone 21-acetate having a melting point of 214 to 215 degrees centigrade, a rotation of [α]$_D$ plus 137 degrees in chloroform, and the following analysis:

Analysis.—Calcd. for $C_{24}H_{33}O_6F$: C, 66.00; H, 7.63; F, 4.36. Found: C, 65.64; H, 7.70; F, 3.86.

Alternatively, isomerization of 2α-methyl-6β-fluorohydrocortisone acetate was productive of 2α-methyl-6α-fluorohydrocortisone acetate. A solution of 0.132 gram of 2α-methyl-6β-fluorohydrocortisone acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less. Crystallization of the residue from acetone-Skellysolve B gave 2α-methyl-6α-fluorohydrocortisone acetate, melting point 214 to 215 degrees centigrade.

EXAMPLE 12

2α - methyl-6β-fluoro-17α-hydroxy-21-acetoxy-4-pregnene-3,11,20-trione (2α-methyl-6β-fluorocortisone acetate) and 2α-methyl-6α-fluoro-17α-hydroxy - 21 - acetoxy-4-pregnene - 3,11,20 - trione (2α-methyl - 6α - fluorocortisone-acetate)

Oxidation of 6β-fluorohydrocortisone acetate and 6α-fluorohydrocortisone acetate of Examples 10 and 11 with chromic acid in acetic acid or in accordance with the procedure disclosed in U. S. Patent 2,751,402 yielded 6β-fluorocortisone acetate and 6α-fluorocortisone acetate, respectively.

EXAMPLE 13

2α-methyl-6α-fluoro-11β,17α,21-trihydroxy - 4 - pregnene-3,20-dione (2α-methyl-6α-fluorohydrocortisone)

A solution of 1.1 grams of 2α-methyl-6α-fluorohydrocortisone acetate, one gram of potassium bicarbonate, 100 milliliters of methanol and fifteen milliliters of water was purged with nitrogen and stirred at 25 degrees centigrade for four hours. The solution was then neutralized by addition of acetic acid and the methanol was removed by distillation under reduced pressure. The residue was extracted with 100 milliliters of methylene dichloride and the extract, after drying over sodium sulfate, was chromatographed over a column of eighty grams of synthetic magnesium silicate. Tthe product fraction was eluted with Skellysolve B hexanes plus twenty and thirty percent acetone and gave 2α-methyl-6α-fluorohydrocortisone.

Following the procedure of Example 13, saponification of the 2α-methyl-6β-fluorohydrocortisone acetate, 2α-methyl - 6β - fluorocortisone acetate and 2α-methyl-6α-fluorocortisone acetate of Examples 10 and 12 is productive of the corresponding 21-hydroxy compounds, 2α-methyl - 6β - fluorohydrocortisone, 2α-methyl-6β-fluorocortisone and 2α-methyl-6α-fluorocortisone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2α-methyl-6-fluoro-11-oxygenated-17α,21-dihydroxy-4-pregnene-3,20-dione of the following formula:

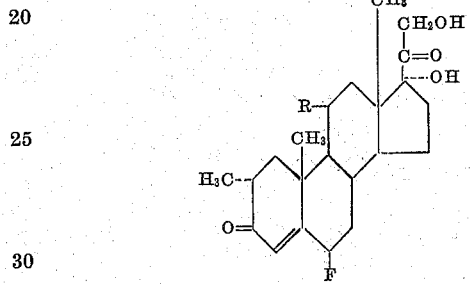

wherein R is a member selected from the group consisting of hydroxy and keto; and the 21-acylates thereof wherein the acyl radical is that of a hydrocarbon carboxylic acid containing from one to twelve carbon atoms, inclusive.

2. 2α-methyl-6-fluorohydrocortisone and the 21-acylates thereof where in the acyl radical is that of a hydrocarbon carboxylic acid containing from one to twelve carbon atoms, inclusive.

3. 2α-methyl-6-fluorohydrocortisone.
4. 2α-methyl-6α-fluorohydrocortisone.
5. 2α-methyl-6β-fluorohydrocortisone.
6. 2α-methyl-6-fluorohydrocortisone 21-acetate.
7. 2α-methyl-6α-fluorohydrocortisone 21-acetate.
8. 2α-methyl-6β-fluorohydrocortisone 21-acetate.
9. 2α-methyl - 6 - fluorocortisone and the 21-acylates thereof wherein the acyl radical is that of a hydrocarbon carboxylic acid containing from one to twelve carbon atoms, inclusive.
10. 2α-methyl-6-fluorocortisone.
11. 2α-methyl-6α-fluorocortisone.
12. 2α-methyl-6-fluorocortisone 21-acetate.
13. 2α-methyl-6α-fluorocortisone 21-acetate.
14. A 3-ketalized 2α-methyl-3-keto-5α,6α-oxido-11-oxygenated-17(20)-pregnene-21-carbonyloxy steroid represented by the following formula:

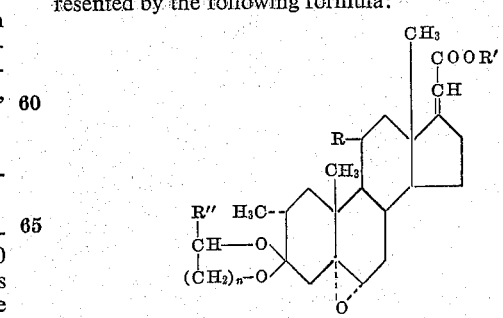

wherein R is selected from the group consisting of hydroxy and keto, R' and R" are selected from the group consisting of hydrogen and lower-alkyl, and n is a whole number from one to two.

15. Methyl 2α-methyl-3,11-diketo-5α,6α-oxido-17(20)-allopregnen-21-oate 3-ethylene ketal.

16. A compound selected from the group consisting of 2α-methyl-3-keto-5α-hydroxy-6β-fluoro-11-oxygenated-17(20)-allopregnene-21carbonyloxy steroid represented by the formula:

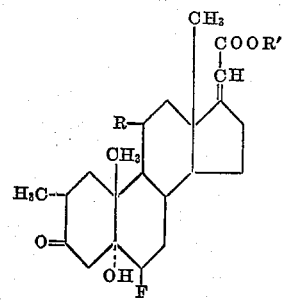

and the 3-cyclic ketal thereof represented by the following formula:

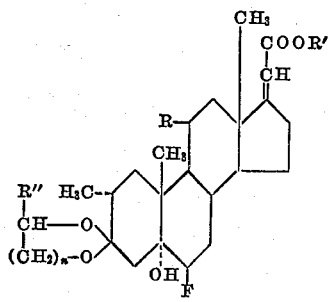

wherein R is selected from the group consisting of hydroxy and keto, R' and R'' are selected from the group consisting of hydrogen and lower-alkyl, and n is a whole number from one to two.

17. Methyl 2α - methyl - 3,11 - diketo - 5α - hydroxy-6β-fluoro-17(20)-allopregnen-21-oate 3-ethylene ketal.

18. Methyl 2α - methyl - 3,11 - diketo - 5α - hydroxy-6β-fluoro-17(20)-allopregnen-21-oate.

19. A 3 - ketalized 2α - methyl - 3 - keto - 5α,11β,21-trihydroxy-6β-fluoro-17(20)-allopregnene represented by the following formula:

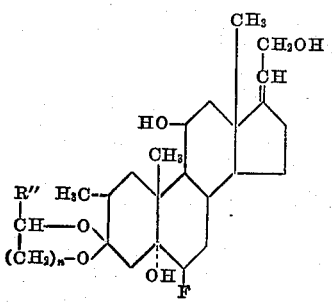

wherein R'' is selected from the group consisting of hydrogen and lower-alkyl, and n is a whole number from one to two; and the 21-acylates thereof wherein the acyl radical is that of a hydrocarbon carboxylic acid containing from one to twelve carbon atoms, inclusive.

20. 2α - methyl - 5α,11β,21 - trihydroxy - 6β - fluoro-17(20)-allopregnen-3-one 3-ethylene ketal.

21. 2α - methyl - 5α,11β - dihydroxy - 21 - acetoxy-6β-fluoro-17(20)-allopregnen-3-one 3-ethylene ketal.

22. A compound selected from the group consisting of 2α - methyl - 5α,11β,17α - trihydroxy - 21 - acetoxy - 6-fluoroallopregnan-3,20-dione represented by the following formula:

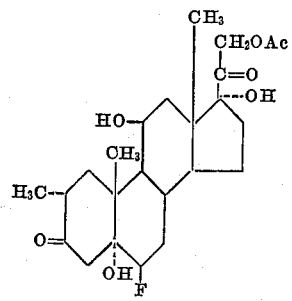

and the 3-cyclic ketal thereof represented by the following formula:

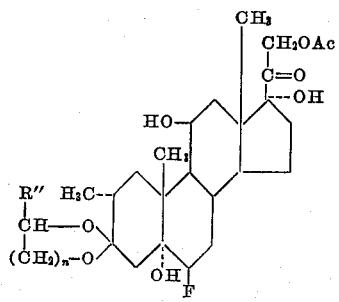

wherein R'' is selected from the group consisting of hydrogen and lower-alkyl, n is a whole number from one to two, and Ac is the acyl radical of a hydrocarbon carboxylic acid containing from one to twelve carbon atoms, inclusive.

23. 2α - methyl - 5α,11β,17α - trihydroxy - 21 - acetoxy-6β-fluoroallopregnan-3,20-dione 3-ethylene ketal.

24. 2α - methyl - 5α,11β,17α - trihydroxy - 21 - acetoxy-6β-fluoroallopregnan-3,20-dione.

References Cited in the file of this patent

UNITED STATES PATENTS 2,707,184    Hogg et al. _____ Apr. 26, 1955

OTHER REFERENCES

Hogg et al., J. A. C. S. 77 (1955), pp. 6401–2.